United States Patent Office 3,406,223
Patented Oct. 15, 1968

3,406,223
STABILIZED POLYOXYMETHYLENES
Hugh Harper Gibbs, Wilmington, Del., assignor to E. I. du Pont de Nemours and Company, Wilmington, Del., a corporation of Delaware
No Drawing. Continuation-in-part of application Ser. No. 344,541, Feb. 13, 1964. This application Dec. 13, 1966, Ser. No. 601,322
9 Claims. (Cl. 260—857)

ABSTRACT OF THE DISCLOSURE

High molecular weight polyoxymethylene polymers having improved hydrolytic stability are obtained by adding a superpolyamide, a phenolic antioxidant and an α,α-disubstituted aliphatic amine to the polymer.

---

This application is a continuation-in-part of my copending application Ser. No. 344,541, filed Feb. 13, 1964 now abandoned.

High molecular weight polyoxymethylenes, those having a number average molecular weight of at least 15,000 have sufficiently good physical properties, such as toughness, stiffness, and tensile strength, to be classed as plastics which may be molded, extruded, or spun into various useful articles. Even though the compositions comprising high molecular weight polyoxymethylene are distinguished from the prior art by their high level of thermal stability, that stabiilty can be enhanced by the incorporation of additives which protect the polymer chain from degradative reactions with components of the atmosphere or with other environments in which the polyoxymethylene may be placed. In order to obtain a high molecular weight polyoxymethylene resin having excellent resistance to basic hydrolysis, as well as the aforementioned good thermal stability, it has been necessary to either convert the high molecular weight polyoxymethylene to a high molecular weight polyoxymethylene ether or to prepare a base stable copolymer comprised of oxymethylene units interspersed with substituted alkylene or oxyalkylene groups. Among the processes available for preparing these resins are those described in U.S. Patents 3,161,616, issued Dec. 15, 1964, to Northrop Brown et al., and U.S. 3,192,182, issued June 29, 1965, to Northrop Brown et al., describing the conversion of high molecular weight polyoxymethylenes to high molecular weight polyoxymethylene ethers. In addition, copending application Ser. No. 51,294, filed Aug. 23, 1960, by E. T. Cline et al., and U.S. Patents 3,194,790, issued July 13, 1965, to Northrop Brown and U.S. 3,076,786, issued Feb. 5, 1963, to Northrop Brown describe the preparation of polymers of formaldehyde with alkylene oxides, vinyl ethers, and vinyl nitrogen compounds, respectively.

Although the high molecular weight polyoxymethylene resins prepared by the processes described in the above-cited application and patents possess excellent thermal stabiilty, they exhibit poor resistance to degradation in water, especially at higher temperatures.

It is an object of this invention to provide a composition of polyoxymethylene that possesses excellent resistance to hydrolytic degradation. It is a particular object to provide a composition of polyoxymethylene that possesses both excellent resistance to basic hydrolysis and resistance to hydrolytic degradation. Other objects will appear in the more detailed explanation of the invention which follows.

The above objects are accomplished by intimately blending or mixing a superpolyamide, a phenolic antioxidant and one or more of a selected class of α,α-disubstituted aliphatic amines with a high molecular weight polyoxymethylene.

The superpolyamide is present at a concentration of from 0.1 to 5 and preferably from 0.2 to 1 percent by weight based upon the polyoxymethylene and is defined as any of the macromolecular superpolyamides, commonly known as nylons, in which carboxamide linkages,

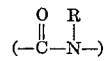

form an integral part of the polymer chain and which upon hydrolysis yield monomeric compounds selected from the group consisting of (1) mixtures of dicarboxylic acids and diamines and (2) omega-aminomonocarboxylic acids. Preferably, the above superpolyamide should have a melting point below about 220° C. and should have carboxamide linkages

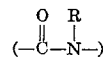

where R is hydrogen, alkyl or alkoxy. Normally, the mixtures of dicarboxylic acids and diamines noted in (1) above would be equimolar mixtures. These superpolyamides are set forth in U.S. Patent 2,993,025, issued July 18, 1961, to R. G. Alsup et al.

The phenolic antioxidant is present at a concentration of from 0.05 to 2 and preferably from 0.1 to 1 percent by weight based upon the polyoxymethylene and is defined as a phenol or substituted phenol having a pK of greater than 6.0 for every stage of dissociation of the phenolic compounds. The term pK is the negative logarithm of the dissociation constant measured at 25° C. The preferred phenols within the above definition are the bis alkylidene phenols wherein the alkylidene group has 1–4 carbon atoms, the hydroxyl substitution is in the 2,2′ or 4,4′ position and a tertiary butyl substituent is adjacent to the hydroxyl group. Additional substituents can be present on these bis alkylidene phenols. Illustrative of the preferred phenols are 2,2′-methylene-bis-(4-methyl-6-tert.-butyl phenol) and 4,4′-butylidene-bis-(3-methyl-6-tert.-butyl phenol).

The amine is present at a concentration of from 0.01 to 5.0 percent by weight based upon said polyoxymethylene as is defined as a compound having the general formula

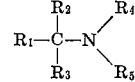

wherein the $R_1$, $R_2$ and $R_3$ are selected from the class consisting of hydroxyalkyl groups having 1–4 carbon atoms and alkyl groups having 1–9 carbon atoms, and the $R_4$ and $R_5$ groups are selected from the class consisting of hydrogen and alkyl groups having 1–4 carbon atoms. Illustrative of the amines employed area:

tertiary-butylamine
N,N-dimethyl-tertiary-butylamine
N,N-dibutyl-tertiary-butylamine
2-amino-2-methyl-1-propanol
5-amino-5-methyl-1-hexanol
2-amino-2-methyl-1,3-propanediol
2-amino-2-ethyl-1,3-propanediol
2-dimethylamino-2-methyl-1-propanol
2,2-dimethyl-1-decylamine
N,N-dimethyl-2,2-dimethyl-1-amylamine
trimethylolaminomethane.

Although the selected α,α-disubstituted aliphatic amines may be employed in concentrations greater than about 5 percent by weight, amounts above this limit are impractical because other commercially desirable properties are adversely affected. The preferred concentrations of these amines are 0.1 to 1 percent by weight based on the polyoxymethylene.

In addition to improving the hydrolytic stability of the base stable polyoxymethylenes, the additives employed in this invention do not stain the base polymer. This advantage is manifested in the lack of color imparted to the polyoxymethylenes during fabrication and in end use tests, e.g., hydrolytic stability and resistance to oxidation. In addition, polyoxymethylene compositions containing this class of $\alpha,\alpha$-disubstituted aliphatic amines resist yellowing in sunlight. For example, compositions containing the organic amine, diphenylbenzidine, turn yellow in a few hours' time while no such change in color is seen when the compositions of this invention are exposed to sunlight.

The additives are preferably incorporated into the base resin by dry blending with the polyoxymethylene and melt processing the resulting blend by extrusion, injection molding, compression molding, casting, etc.

The majority of polyoxymethylenes which may be subsequently treated to obtain the base stable resins employed in the present invention are made by polymerizing formaldehyde in the presence of any group of polymerization initiators, e.g., aliphatic amines; tertiary amino-nitrogen polymers; trihydrocarbon phosphines, arsines, or stibines; organometallic compounnds; metal carbonyls; quaternary ammonium or phosphonium salts; and tertiary phosphonium salts. These processes are described and claimed in United States Patents:

2,734,889, issued Feb. 14, 1956, to F. C. Starr, Jr.
2,828,286, issued Mar. 25, 1958, to R. N. MacDonald.
2,841,570, issued July 1, 1958, to R. N. MacDonald.
2,844,561, issued July 22, 1958, to M. F. Bechtold et al.
2,848,437, issued Aug. 19, 1958, to W. P. Langsdorf et al.
2,994,687, issued Aug. 1, 1961, to H. H. Goodman et al.
3,000,860, issued Sept. 19, 1961, to Northrop Brown et al.
3,000,861, issued Sept. 19, 1961, to Northrop Brown et al.

Following the preparation of the resin as described hereinabove, the material is converted to a base stable polyoxymethylene ether. An alternative route to a base stable resin would be to prepare a base stable copolymer comprised of oxymethylene units interspersed with substituted alkylene or oxyalkylene units. In either case, though the base stable polymer or copolymer may possess sufficient thermal stability to be molded without refining, in the preparation of molded objects which require extreme thermal stability, it may be desirable to remove substantially all of the unreacted polyoxymethylenes. The unreacted polyoxymethylene may be removed by dissolving the unpurified product and heating the solution in the presence of a strong amine or a caustic to depolymerize the unreacted polyoxymethylene. Solvents which may be used in the presence of an amine include the aliphatic and aromatic hydroxy compounds such as cyclohexanol, glycol, benzyl alcohol and phenol, and the preferred solvents for the caustic treatment are the ethers, such as trioxymethylene dimethyl ether and diethylene glycol dimethyl ether. Amines and caustics which are useful in the purification step include triethylamine, tripropylamine, sodium hydroxide, and potassium hydroxide. A particularly desirable caustic is an equimolar mixture of sodium hydroxide and potassium hydroxide because it forms a eutectic at a convenient processing temperature. Another procedure which may be employed for the removal of unreacted polyoxymethylene is the thermal degradation of the solid or molten polymer, or of the polymer in solution, in the absence of an amine or a caustic.

After the base stable polymer or copolymer has been refined, it may be subjected to a variety of tests including a test to determine the percent base unstable fraction (percent BUSF). In many instances, this value is also obtained for the melt processed composition. The percent base unstable fraction is determined by heating a weighed amount of the base stable polyoxymethylene in benzyl alcohol ($\sim 3\%$ solution) with 1.5 to 2.0 percent of an added base, e.g., tri-n-butylamine, for 30 to 60 minutes at 150–165° C. The formaldehyde evolved from the base unstable fraction is now present in the benzyl alcohol and the amount is determined by extracting the formaldehyde from the benzyl alcohol solution with water and subjecting an aliquot of the aqueous solution to a standard colorimetric analysis.

Number average molecular weight may be measured by the classical methods of osmomentry, although this method is cumbersome and not particularly suitable for the lower range of molecular weights. A more convenient method, used in the examples of this description, involves the measurement of the inherent viscosity of the polymer. The inherent viscosity of the polymers (I.V.) of this invention is measured by dissolving 0.125 gram of the polymer in 25 ml. of reagent grade phenol which has been purified by distillation from solid caustic. The polymer is not soluble in the phenol at room temperature and usually the mixture is heated to 120° C. to increase the rate of solution of the polymer. The viscosity of the phenol solvent and the viscosity of the phenol polymer solution is measured at 90° C. by noting the time required to pass the same volume of each material through an Ostwald Viscometer. The inherent viscosity (I.V.) is then determined by using the following formula:

$$\text{I.V.} = \frac{2.303 \log \frac{\text{time of solution}}{\text{time of solvent}}}{\text{grams of polymer}/100 \text{ ml solution}}$$

This inherent viscosity shows close correlation with the number average molecular weight of the polymer in which the correlation is made.

The thermal stability of the compositions of the present invention are characterized by "Gas Index" (G.I.). The numerical value of G.I. is 3.7×the milliliters of gas evolved per gram of polymer per 15 minutes elapsed time at 231° C. The G.I. of a polymeric sample is determined by heating a weighed sample of polymer in a hypodermic syringe at 231° C. and observing the position of the syringe plunger at 5 and 20 minutes after the beginning of the test. The syringe which is used in this test should be about 50 millimeters in volume having the bottom of the syringe cylinder flat and sealed with a capillary tube extending through the syringe plunger to provide a means for introducing inert gas at the base, or bottom, of the cylinder. The capillary tube which is inserted through the syringe plunger extends beyond the upper portion thereof, and is covered with a suitable means to seal the end of the capilliary tube. A sample holder, such as a flat glass dish, is placed in the bottom of the syringe cylinder. All equipment used in the test is well cleaned. Polymer, in the form of molding powder or other equivalent melt composited material is weighed to the nearest 0.005 gram and placed in the sample holder which is inserted in the base of the syringe and the plunger is pushed into the syringe cylinder to expel all the air therefrom. The syringe is then evacuated and filled with nitrogen several tmes by introducing the nitrogen and withdrawing the gas through the capilliary tube in the plunger. During the last purging of the syringe, a small amount of silicone oil is placed on the upper portion of the plunger to insure a tight seal thereof with the cylinder. The capillary tube is then sealed and the syringe is placed in a vapor bath at 231° C. The vapor bath may be vapors of n-decyl alcohol. The position of the syringe cylinder is noted with a cathetometer at five minutes and again at twenty minutes after the syringe is first placed in the vapor bath. The change in the position of the syringe piston over the 15 minute period determines the amount of gas evolved in the test, and, thus the amount of polymer which has degraded to monomer or other gas. The value for G.I. is 3.7 times the indicated number of milliliters of gas evolved per gram of polymer during the period of from five to twenty minutes after the beginning of the test. Unless otherwise reported herein, the same procedure is used for each of the samples indicated.

The following examples serve to illustrate the novel compositions of this invention and are not intended to restrict the invention since obvious modifications would occur to one skilled in the art.

lizers is readily apparent from the overall trend in the data relating to the stability of the compositions shown.

TABLE I

| Example | 2,2-disubstituted aliphatic amine | Gas index | Percent BUSF* | Percent weight loss in boiling water (hours) | | | | | |
|---|---|---|---|---|---|---|---|---|---|
| | | | | 264 | 456 | 600 | 768 | 840 | 936 |
| 1 | None; control sample | 41 | 6.2 | 0.71 | 0.23 | 3.6 | 13.5 | 34.9 | |
| 2 | Trimethylolaminomethane | 35 | 4.0 | 0.79 | 1.4 | 2.2 | 4.2 | 3.4 | 9.2 |
| 3 | 2-amino-2-methyl-1,3-propanediol | 28 | 3.8 | 0.66 | 1.6 | 3.4 | 8.1 | 15.2 | |
| 4 | 2-amino-2-ethyl-1,3-propanediol | 29 | 4.8 | 0.78 | 1.8 | 2.2 | 4.9 | 5.3 | 11.2 |
| 5 | 2-dimethylamino-2-methyl-1-propanol | 41 | 3.2 | 0.78 | 1.6 | 3.1 | 4.8 | 7.0 | 20.9 |
| 6 | 2-amino-2-methyl-1-propanol | 30 | 4.0 | 0.67 | 2.1 | 2.3 | 3.7 | 10.7 | 17.8 |

*Percent base-unstable fraction; measured on extruded pellets.

EXAMPLES 7 TO 18

These examples illustrate the effect of varying amounts of trimethylolaminomethane on the hydrolytic stability of two base stable polyoxymethylene diether resins (Table II, number average molecular weight equal to 30,000; Table III, number average molecular weight equal to 25,000). In addition, the data in Table II illustrate the effect of varying amounts of antioxidant on compositions containing the same amount of trimethylolaminomethane.

TABLE II

| Example | TMAM,[1] weight percent | Polyamide,[2] weight percent | Anti-oxidant,[3] weight percent | Gas index | Percent BUSF[4] | Percent weight loss in boiling water (hours) | | | | | | | |
|---|---|---|---|---|---|---|---|---|---|---|---|---|---|
| | | | | | | 240 | 480 | 648 | 792 | 984 | 1,248 | 1,344 | 1,464 | 1,656 |
| 7 | ([5]) | 0.5 | 0.2 | 16 | 1.1 | [6] 0.32 | 1.0 | 4.9 | 42.4 | | | | | |
| 8 | 0.1 | 0.5 | 0.1 | 14 | 0.88 | 0.42 | 0.73 | 0.91 | 1.3 | 1.4 | 5.6 | 14.9 | | |
| 9 | 0.1 | 0.5 | 0.3 | 14 | 0.74 | 0.36 | 0.72 | 1.1 | 1.4 | 2.3 | 10.5 | | | |
| 10 | 0.1 | 0.5 | 0.7 | 10 | 0.79 | 0.59 | 0.81 | 1.2 | 1.8 | 2.2 | 8.0 | | | |
| 11 | 0.05 | 0.5 | 0.1 | 10 | 0.93 | 0.32 | 0.63 | 0.86 | 1.1 | 3.8 | 41.2 | | | |
| 12 | 0.3 | 0.5 | 0.1 | 9 | 0.72 | 0.51 | 0.77 | 1.0 | 1.2 | 1.9 | 3.3 | | 15.5 | |
| 13 | 0.1 | 1.0 | 0.1 | 10 | 0.68 | 0.38 | 0.70 | 0.85 | 1.2 | 1.8 | 4.5 | | 7.0 | |
| 14 | 0.1 | 1.0 | 0.7 | 10 | 0.63 | 0.47 | 0.79 | 1.0 | 1.3 | 2.1 | 2.9 | | 5.6 | |
| 15 | 0.1 | 0.5 | 0.1 | 10 | 0.71 | 0.35 | 0.63 | 0.85 | 1.5 | 1.5 | 6.6 | | | |

TABLE III

| Example | TMAM,[1] weight percent | Polyamide,[2] weight percent | Anti-oxidant,[3] weight percent | Gas index | Percent BUSF[4] | Percent weight loss in boiling water (hours) | | | | | | | | |
|---|---|---|---|---|---|---|---|---|---|---|---|---|---|---|
| | | | | | | 192 | 360 | 528 | 672 | 840 | 1,008 | 1,176 | 1,344 | 1,512 | 1,680 |
| 16 | ([5]) | | 0.1 | 86 | 3.6 | 0.22 | 0.45 | 1.0 | 1.3 | 42.0 | | | | | |
| 17 | 0.1 | 0.5 | 0.1 | 16 | 3.6 | 0.31 | 0.65 | 0.97 | 1.0 | 3.1 | 2.0 | 2.2 | 4.1 | 5.6 | 12.8 |
| 18 | 0.3 | 0.5 | 0.1 | 25 | 3.4 | 0.66 | 1.2 | 1.4 | 1.7 | 2.6 | 3.4 | | | | |

[1] Trimethylolaminomethane.
[2] Terpolymer of approximately 38% polycaprolactam, 35% polyhexamethylene adipamide, 27% polyhexamethylene sebacamide.
[3] 2,2'-methylene-bis-(4-methyl-6-tertiary-butylphenol).
[4] Percent base-unstable fraction; measured on extruded pellets.
[5] None; control sample.
[6] 312 hours.

EXAMPLES 1 to 6

These examples illustrate the effect of five α,α-disubstituted aliphatic amines in combination with a polyamide and a phenolic antioxidant on the hydrolytic stability of base stable polyoxymethylene. The compositions were prepared by first dry blending a refined base stable polyoxymethylene diether (number average molecular weight=26,000) with 0.5 weight percent of a polyamide thermal stabilizer (terpolymer of approximately 38% polycaprolactam/35% polyhexamethylene adipamide/27% polyhexmethylene sebacamide), 0.1 weight percent of an antioxidant, 2,2'-methylene-bis-(4-methyl-6-tert.-butyl phenol), and 0.1 weight percent of the respective α,α-disubstituted aliphatic amines. The blends were then extruded in a standard screw-type extruder at 190° C. into a rod ⅛ of an inch in diameter which was subsequently quenched in a water bath and cut into small cubes. These cubes were then injection molded in a one ounce Watson-Stillman machine into test bars 5″ x ½″ x ⅛″ in dimension. The bars were then cut into two pieces and dried in a vacuum oven overnight at 80–90° C. and weighed. A set of twelve half-bars were used for determining the hydrolytic stability of each sample. The weighed half-bars were placed in a flask fitted with a water-cooled condenser and 400 ml. of distilled water added and brought to a boil. After given time intervals, the bars were removed from the boiling water, dried as indicated above and weighed. All the data including percentage weight loss as a function of time in the boiling water bath are given in Table I. Occasionally imperfections in the bars resulted in inconsistent weights between successive immersion times; however, the effectiveness of the present stabi- The foregoing examples illustrate the effectiveness of the additives which improve greatly the hydrolytic stability of the base stable polyoxymethylene compositions. In addition, some minor effects are seen due to varying the concentration of the polyamide thermal stabilizer and antioxidant. In addition to the amines, pigments, fillers, and other useful additives may be incorporated in the compositions without affecting the properties enumerated herein. All these desirable properties are coupled with the inherent characteristics of the base stable polyoxymethylene resins, viz, good thermal stability and an excellent resistance to caustic hydrolysis. Products of the present invention find wide use in preparing objects by extrusion and molding such as film, filamentary structure, fiber, filaments, bristles, pipes, tubes, rods, sheets, bottles, and various other shaped articles.

I claim:

1. A hydrolytically stable composition comprising a normally base stable, high molecular weight polyoxymethylene having intimately dispersed therein from 0.1–5 percent by weight based upon said polyoxymethylene of a superpolyamide consisting of carboxamide linkages of the formula

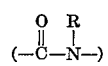

forming an integral portion of the superpolyamide and which upon hydrolysis yields monomeric compounds selected from the group consisting of (1) mixtures of dicarboxylic acids and diamines and (2) omega-aminocarboxylic acids, from 0.05–2 percent by weight based upon said polyoxymethylene of a bis alkylidene phenol wherein the alkylidene group has 1–4 carbon atoms, the hydroxyl substitution is in the 2,2' or 4,4' position and a tertiary butyl substituent is adjacent to the hydroxyl group and from 0.01–5.0 percent by weight based upon said polyoxymethylene of a compound having the general formula

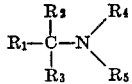

wherein $R_1$, $R_2$ and $R_3$ are groups selected from the class consisting of hydroxyalkyl groups having 1–4 carbon atoms and alkyl groups having 1–9 carbon atoms, and the $R_4$ and $R_5$ are groups selected from the class consisting of hydrogen and alkyl groups having 1–4 carbon atoms.

2. The composition of claim 1 wherein the high molecular weight polyoxymethylene is a base stable polyoxymethylene diether.

3. The composition of claim 1 wherein the high molecular weight polyoxymethylene is a base stable copolymer comprised of oxymethylene units interspersed with units selected from the class consisting of substituted alkylene and oxyalkylene units.

4. A hydrolytically stable composition comprising a high molecular weight base stable polyoxymethylene diether having intimately dispersed therein from 0.2–1 percent by weight based upon said polyoxymethylene of a superpolyamide consisting of carboxamide linkages of the formula

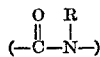

forming an integral portion of the superpolyamide and which upon hydrolysis yields monomeric compounds selected from the group consisting of (1) mixtures of dicarboxylic acids and diamines and (2) omega-aminocarboxylic acids, from 0.1–1 percent by weight based upon said polyoxymethylene of a bis alkylidene phenol wherein the alkylidene group has 1–4 carbon atoms, the hydroxyl substitution is in the 2,2' or 4,4' position and a tertiary butyl substituent is adjacent to the hydroxyl group and from 0.1–1 percent by weight based upon said polyoxymethylene of an amine having the general formula

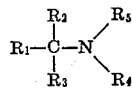

wherein $R_1$, $R_2$ and $R_3$ are groups selected from the class consisting of methyl and hydroxymethyl groups and the $R_4$ and $R_5$ are groups selected from the class consisting of hydrogen and methyl groups.

5. The composition of claim 4 wherein the superpolyamide is a terpolymer consisting of about 38% polycaprolactam, about 35% polyhexamethylene adipamide and about 27% polyhexamethylene sebacamide, said phenolic antioxidant is 2,2'-methylene-bis(4-methyl-6-tert.-butyl phenol).

6. The composition of claim 5 wherein said amine is 2-amino-2-methyl-1-propanol.

7. The composition of claim 5 wherein the said amine is 2-amino-2-methyl-1,3-propanediol.

8. The composition of claim 5 wherein the said amine is 2-dimethylamino-2-methyl-1-propanol.

9. The composition of claim 5 wherein the said amine is trimethylolaminomethane.

References Cited

UNITED STATES PATENTS

| | | | |
|---|---|---|---|
| 2,966,476 | 12/1960 | Kralovec | 260—45.9 |
| 3,294,734 | 12/1966 | Schmidt et al. | 260—45.9 |
| 3,296,194 | 1/1967 | Wagner et al. | 260—45.9 |
| 3,296,206 | 1/1967 | Schott et al. | 260—45.9 |
| 3,336,262 | 8/1967 | Sidi | 260—45.9 |

DONALD E. CZAJA, *Primary Examiner.*

H. E. TAYLOR, JR., *Assistant Examiner.*